(12) United States Patent
Tatai et al.

(10) Patent No.: US 7,775,441 B2
(45) Date of Patent: Aug. 17, 2010

(54) CARD ISSUING DEVICE

(75) Inventors: Toshio Tatai, Nagano (JP); Keiji Ohta, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 232 days.

(21) Appl. No.: 12/082,992

(22) Filed: Apr. 16, 2008

(65) Prior Publication Data

US 2008/0245874 A1   Oct. 9, 2008

(30) Foreign Application Priority Data

Apr. 27, 2007   (JP) .............................. 2007-118897

(51) Int. Cl.
*G06K 13/00* (2006.01)
(52) U.S. Cl. ...................................................... 235/475
(58) Field of Classification Search ................. 235/380, 235/475, 479, 492
See application file for complete search history.

(56) References Cited

U.S. PATENT DOCUMENTS

| 6,505,772 | B1 * | 1/2003 | Mollett et al. | 235/379 |
| 6,598,794 | B1 * | 7/2003 | Ishii | 235/449 |
| 2004/0089723 | A1 * | 5/2004 | Moriya | 235/475 |

* cited by examiner

*Primary Examiner*—Seung H Lee
(74) *Attorney, Agent, or Firm*—Frommer Lawrence & Haug LLP

(57) ABSTRACT

To provide a card issuing device which can be manufactured smaller and at lower cost. The card issuing device includes the card storage in which a plurality of cards are stacked up, the card processing section to which the card is extracted from the card storage and at which information recorded on the card is read or information is recorded on the card, and the card extracting mechanism which extracts the card stored in the card storage toward the card processing section. At the card processing section, a card exposing section is formed so that a portion of the card extracted by the card extracting mechanism is exposed.

8 Claims, 6 Drawing Sheets

[FIG.1]
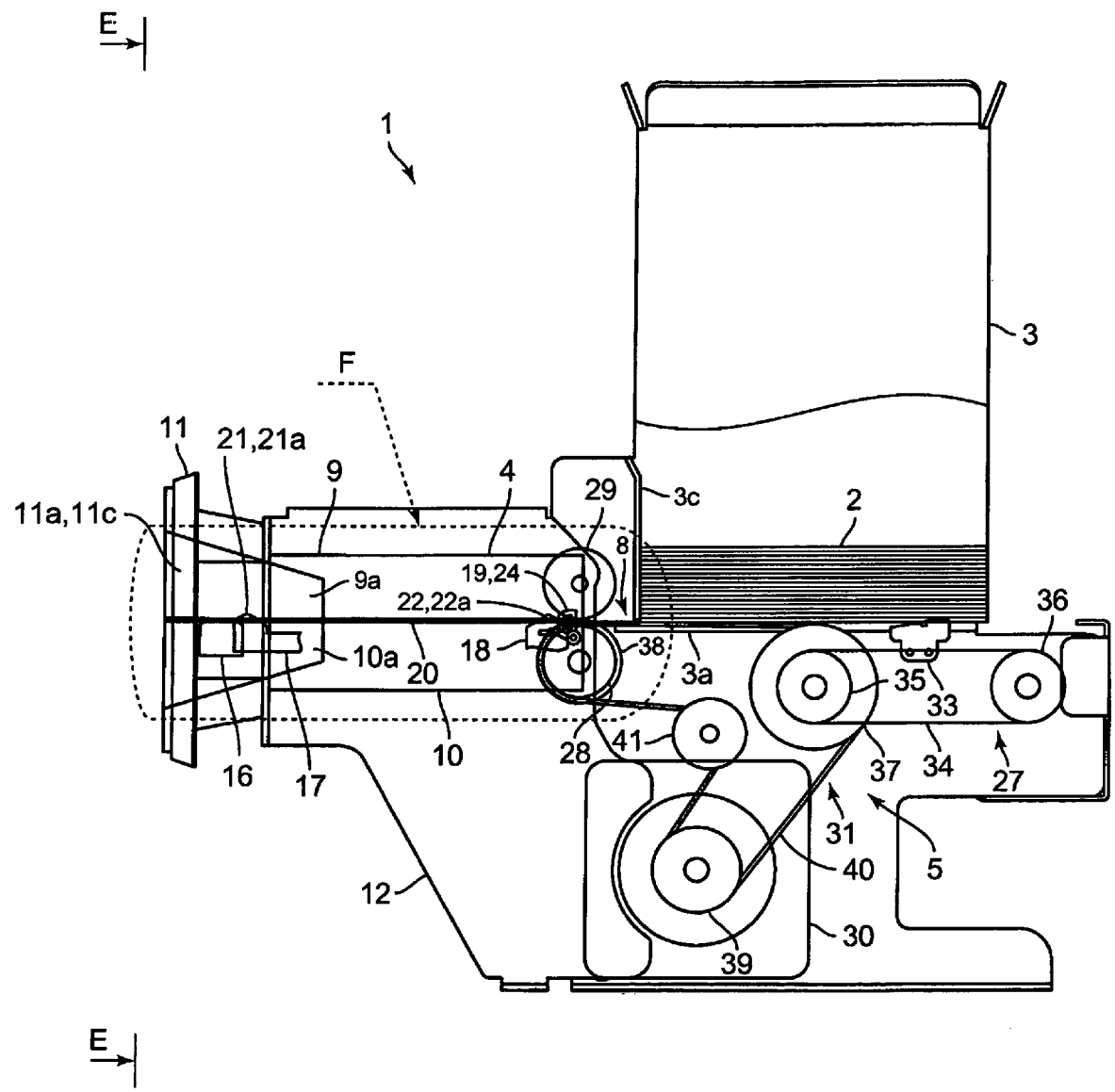

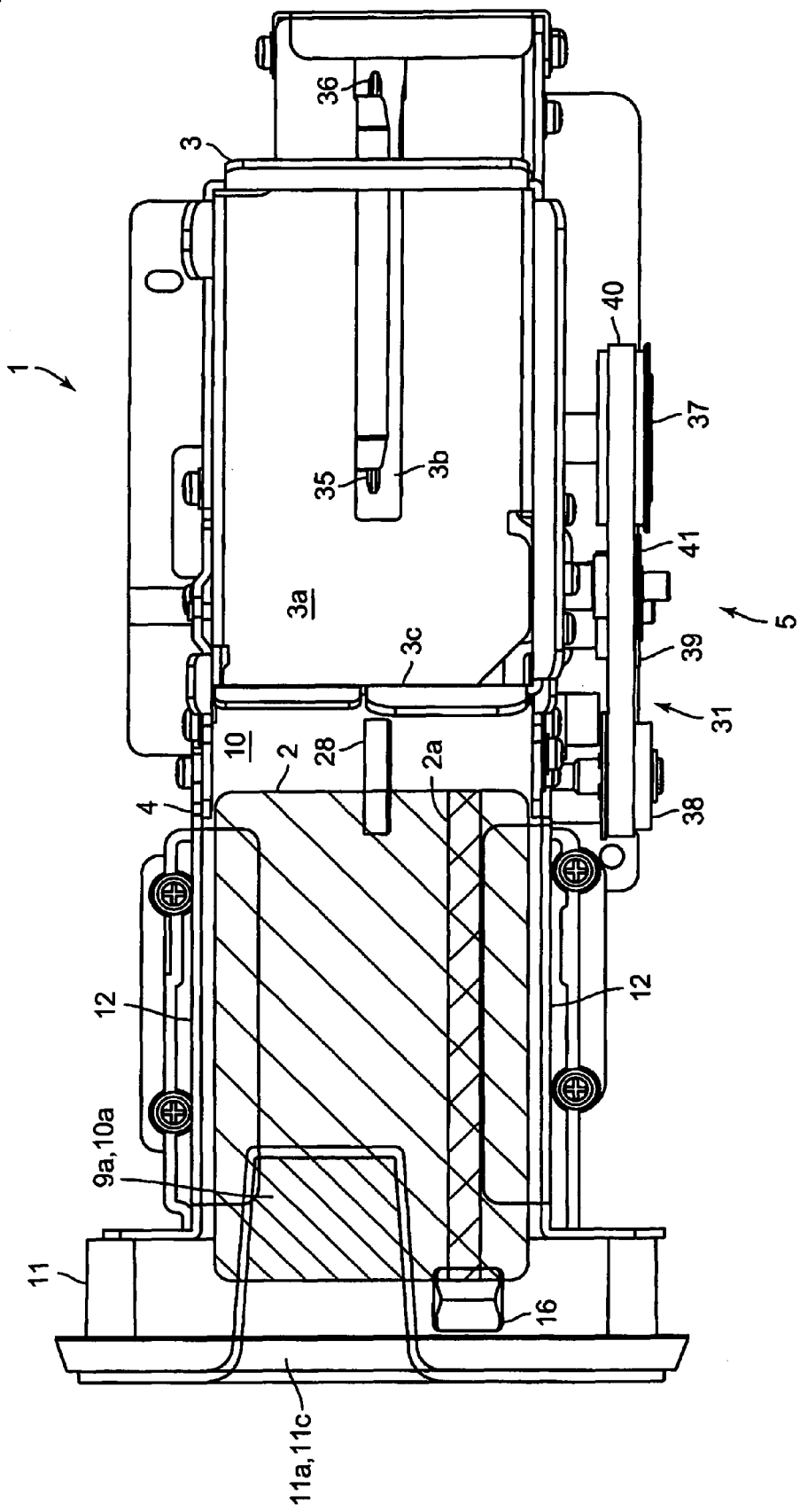
[FIG.2]

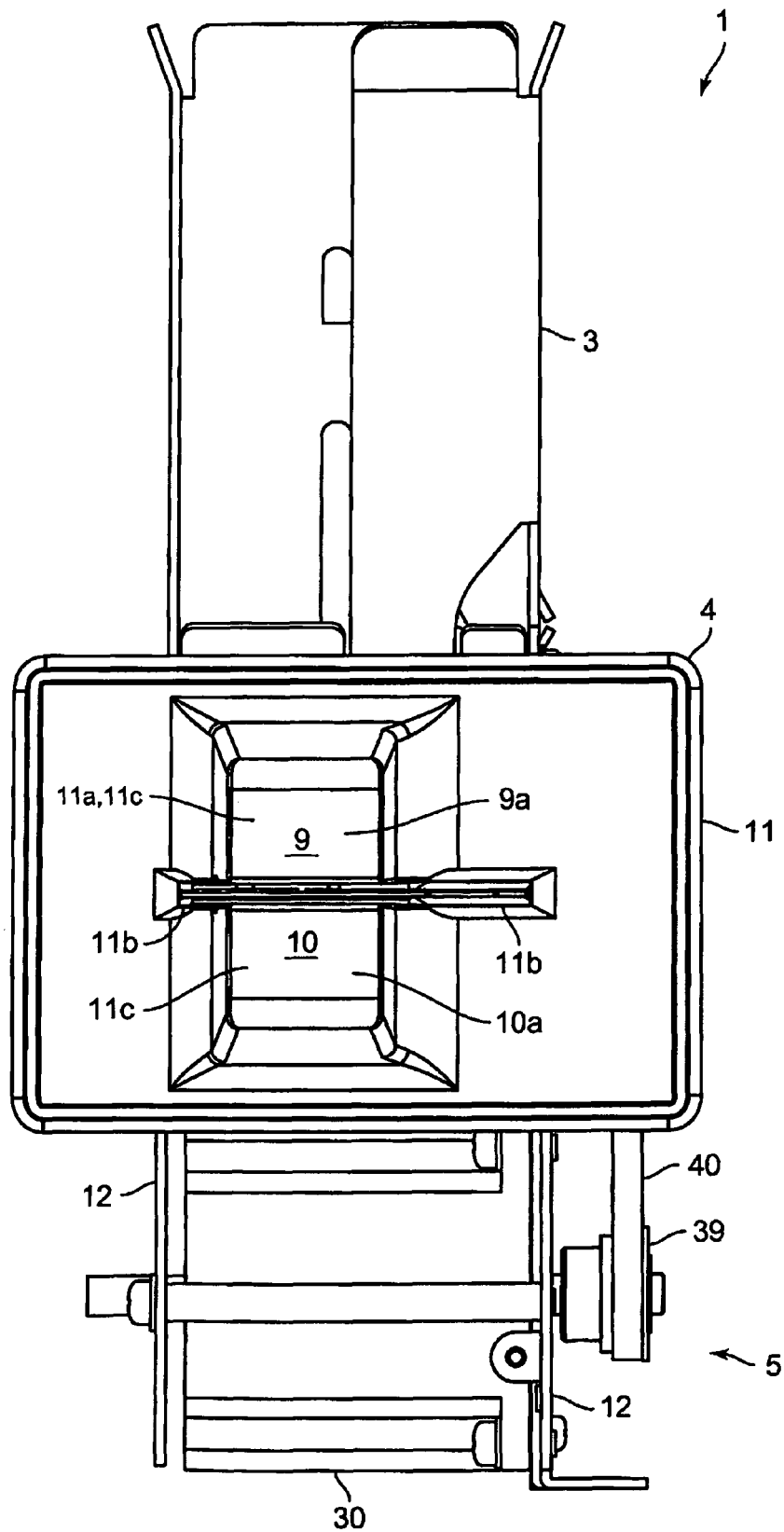
[FIG.3]

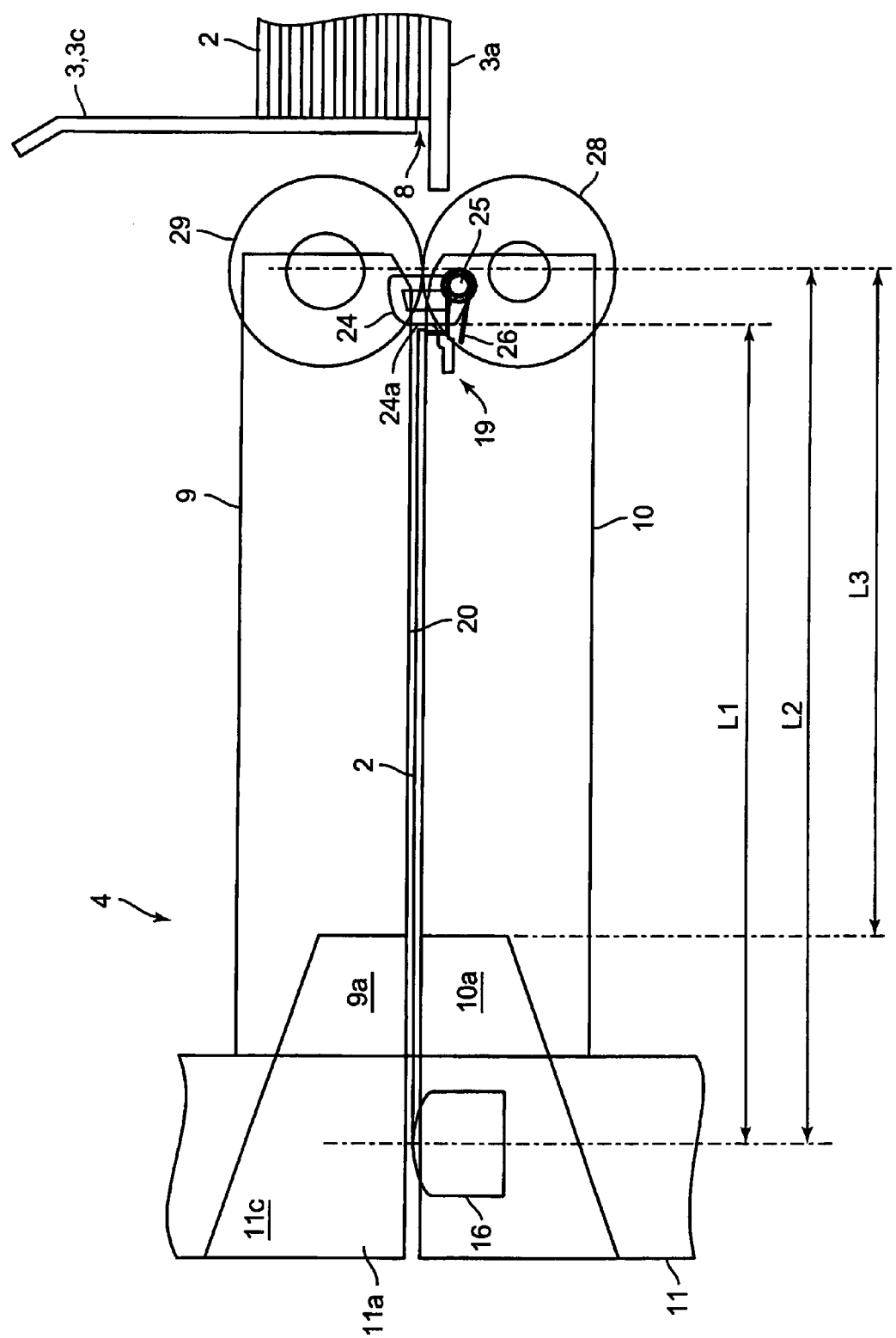
[FIG.4]

[FIG.5]
(A)
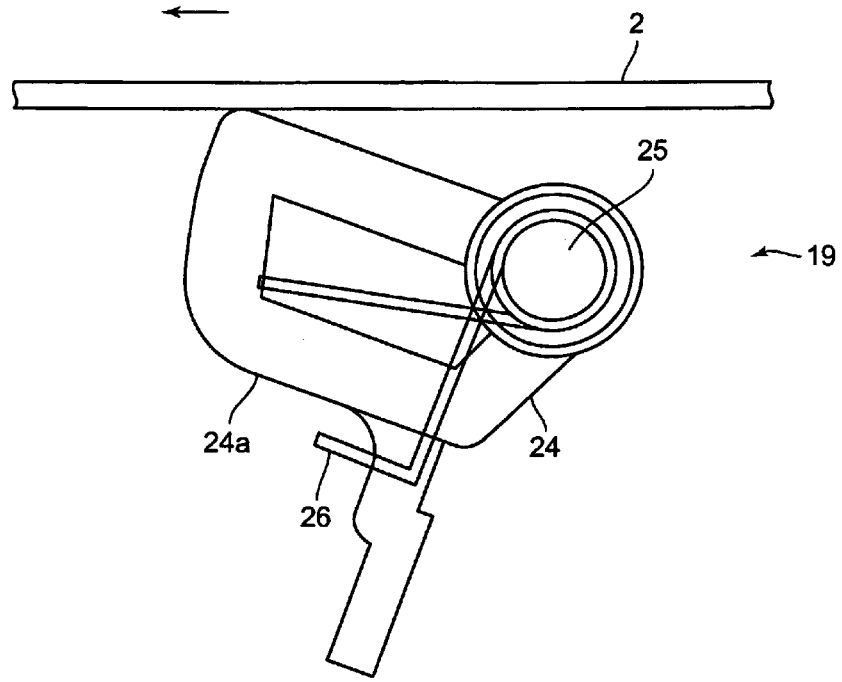
(B)
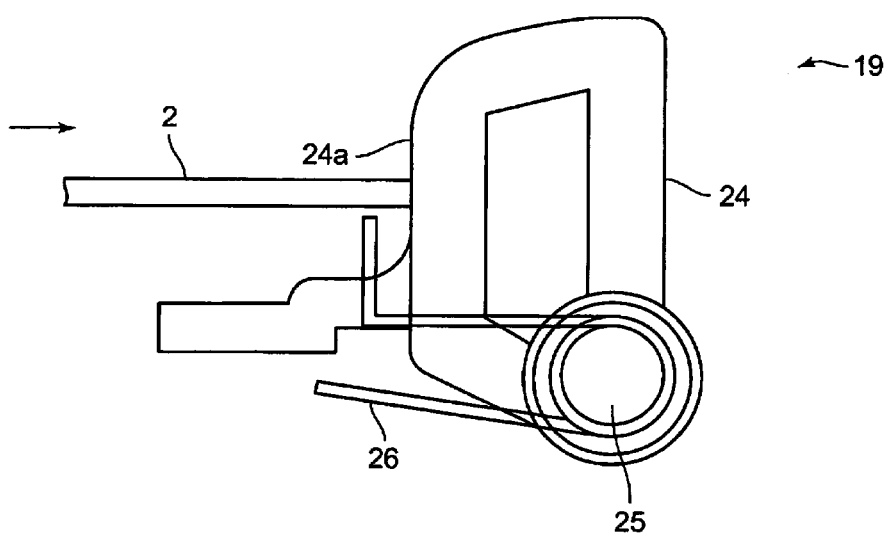

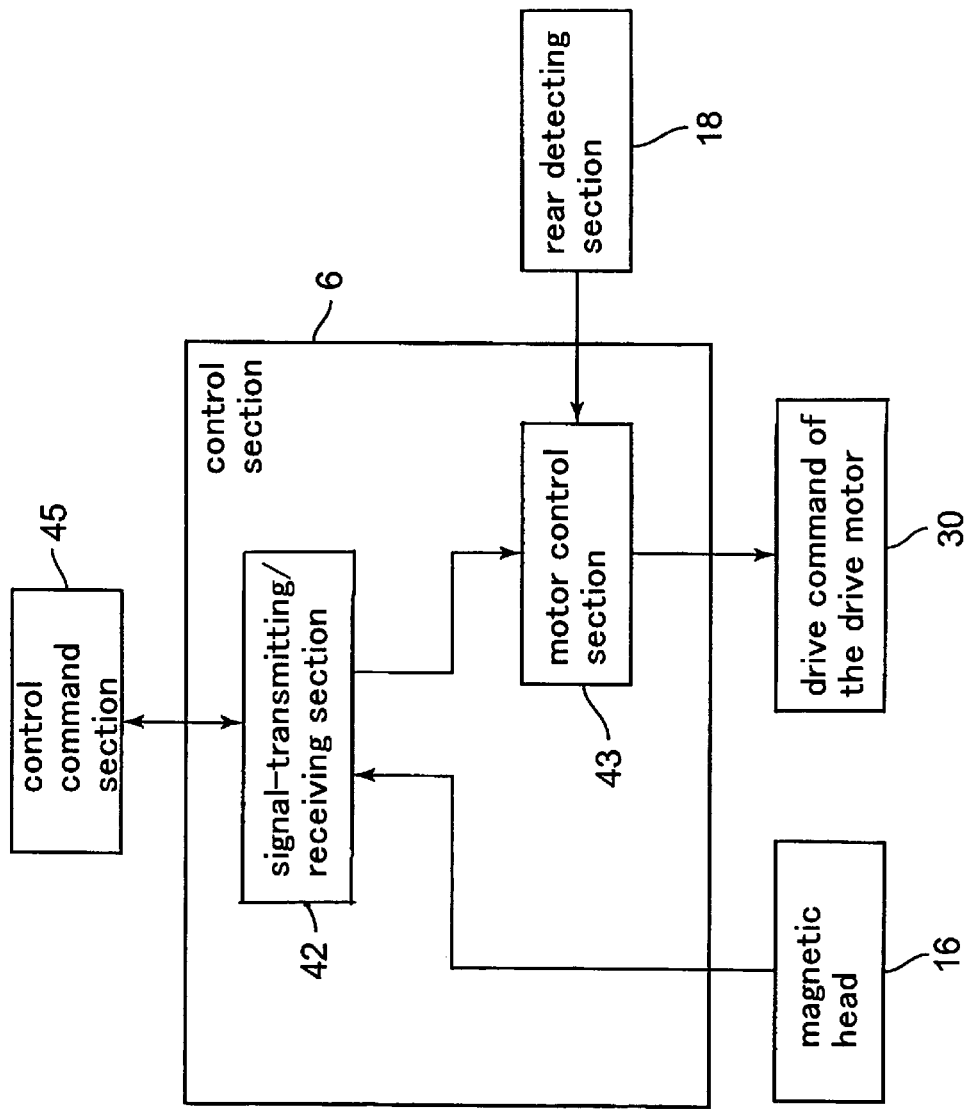
[FIG.6]

CARD ISSUING DEVICE

The present application claims priority from Japanese Patent Application Publication No. JP-2007-118897, which was filed on Apr. 27, 2007, the disclosure of which is incorporated herein by reference in its entirety.

BACKGROUND OF THE INVENTION

1. Field of the Invention

The present invention relates to a card issuing device that issues cards.

2. Description of Related Art

Conventionally known is a card issuing device which is equipped with a card reader section for reproducing information from and recording information onto cards such as magnetic cards, a card hopper in which cards are stored before use, and a plurality of rollers which extracts cards from the card hopper toward the card reader (for example, see Japanese Unexamined Patent Application H5-159110 (Tokkai)).

In the card issuing device disclosed in Japanese Unexamined Patent Application H5-159110 (Tokkai), the card reader is equipped with a magnetic head that reproduces magnetic information recorded on cards and records magnetic information onto cards and with transporting rollers for transporting cards inside the card reader section. The transporting rollers are generally driven by a motor.

In recent years, a greater variety of cards are issued by card issuing devices. For example, widely used are cards which are activated as magnetic information recorded in advance on the cards stored in a card hopper is read by a card reader section at the time of card issuing. In the card issuing device that issues cards in such a manner, reading of magnetic information is the only function required at the card reader section. In other words, in a card issuing device that issues cards in such a manner, only a simple function is required at the card reader section.

However, in the card issuing device disclosed in Japanese Unexamined Patent Application H5-159110 (Tokkai), even if only a simple function is required at the card reader section, the configuration of the card reader section becomes complicated because the card reader section is equipped with transporting rollers which are driven by a motor. Consequently, the size and cost of the card issuing device is greater than necessary.

Therefore, an objective of the present invention is to provide a card issuing device that can be made smaller and at lower cost.

SUMMARY OF THE INVENTION

To achieve the objective, a card issuing device of the present invention comprises a card storage in which a plurality of cards are stacked up, a card processing section to which the cards extracted from the card storage are transported and at which information recorded on the cards is read and/or information is recorded onto the cards, and a card extracting mechanism for extracting the cards stored in the card storage toward the card processing section; wherein the card processing section is provided with a card exposing section so that a portion of the card extracted by the card extracting mechanism is exposed thereat.

In the card issuing device of the present invention, the card exposing section is formed at the card processing section to expose a portion of the card extracted by the card extracting mechanism from the card storage. Therefore, a user can grasp the card which is extracted by the card extracting mechanism and exposed at the card exposing section and pull it out from the card processing section. For this reason, there is no need to provide a card-transporting mechanism configured by transporting rollers, a motor, etc. to the card processing section. Consequently, the configuration of the card issuing device can be simplified, downsizing the card issuing device and lowering its manufacturing cost.

In the present invention, it is preferred that the card issuing device be equipped with a card-passing preventor to prevent the cards from passing from the card processing section toward the card storage. If the reading or recording of information fails at the card processing section at the time of issuing a card, a user may re-insert the card to the card processing section again so that the reading or recording of information can be performed at the card processing section again. Therefore, even when the reading or recording of information is performed again at the card processing section, the card is prevented from entering the inside of the card storage by this configuration. Consequently damage to the cards or card jams (the card gets stuck inside the device) can be prevented.

In the present invention, it is preferred that the card processing section have a processing mechanism that performs reading of information recorded on the cards and/or recording of information onto the cards, that the card extracting mechanism be equipped with an extracting roller arranged between the card storage and the processing mechanism for extracting the cards toward the card processing section, and that a portion of the card extracted by the extracting roller be exposed at the card exposing section. With this configuration, the cards can be extracted with precision such that a portion of the card is exposed at the card exposing section.

In the present invention, it is preferred that the card have a magnetic strip on which magnetic information is recorded, that the processing mechanism be provided with a magnetic head for reading magnetic information recorded on the magnetic strip, and that the distance from the extracting roller to the magnetic head be greater than the length of the magnetic strip on which the magnetic information is recorded. In this way, magnetic information recorded on the magnetic strip can be properly read while a user pulls out the card from the card processing section.

In the present invention, it is preferred that the card extracting mechanism be provided with a pad roller that is urged toward the extracting roller, and that the extraction of the card is completed as the card exits the extracting roller and the pad roller. This configuration can reduce pulling resistance when a user pulls out the card from the card processing section. Therefore, a user can easily pull out the card from the card processing section.

In the present invention, the card extracting mechanism may be provided with a pad roller that is urged toward the extracting roller, and the extraction of the card may be completed as the end portion of the card close to the card storage in the extracting direction of the card is held between the extracting roller and the pad roller. With this configuration, the card can be precisely stopped by the extracting roller and the pad roller function. Therefore, after the card stops, the card processing section can properly perform the card-processing.

In the present invention, it is preferred that the card issuing device further comprise a drive motor for driving the extracting roller, a detecting section arranged in the vicinity of the extracting roller for detecting the edge portion of the card in the extracting direction, and a motor control section for controlling the drive motor, and that the motor control section [starts] decelerating the drive motor after a predetermined period of time that comes after the detecting section detects the edge portion of the card close to the card processing section in the extracting direction, and then stops [the motor]. Even when the extraction of the card is complete as the card exits the extracting roller and the pad roller, precision of stopping the card can be improved by this configuration. Also, when the extraction of a card is completed as the end portion of the card close to the card storage in the card extracting direction is held between the extracting roller and the pad roller, the precision of stopping the card can be further improved.

In the present invention, it is preferred that the card extracting mechanism be provided with a storage transporting mechanism arranged on the bottom face of the card storage and that the storage transporting mechanism and the extracting roller be driven by a common drive source. In this way, the configuration of the card issuing device can be simplified.

In the present invention, it is preferred that a signal transmitting means be provided for sending the reading result of information recorded on the card to a host device in which the card issuing device is installed. In this way, when the reading of the information recorded on the card has failed, the host device can give a user a warning to repeat the reading of the information. For example, when a display is provided to the host device, the display can indicate the necessity to repeat the reading of the information. When a flashing lamp is provided to the host device, a lamp can be flashed to indicate the necessity to repeat the reading of information. Consequently, information recorded on the card can be read with precision.

As described above, the card issuing device of the present invention can be downsized and manufactured at lower cost.

BRIEF DESCRIPTION OF THE DRAWINGS

FIG. 1 is a diagram to explain a configuration of a card issuing device 1 of an embodiment of the present invention, showing it from the side.

FIG. 2 is a diagram to explain the configuration of the card issuing device 1 of FIG. 1, showing it from the top.

FIG. 3 is a diagram showing the card issuing device 1 in the E-E direction of FIG. 1.

FIG. 4 is an enlargement of section F in FIG. 1.

FIGS. 5(A) and 5(B) are diagrams showing the operation of a card-passing preventor 19 shown in FIG. 4: 5(A) shows its status when a card 2 is extracted from the card storage 3 toward the card processing section 4; 5(B) shows its status when the card 2 is inserted at the card insertion slot 11a into the card processing section 4.

FIG. 6 is a block diagram showing how the control section 6 of the card issuing device 1 of FIG. 1 is configured with peripherals.

DETAILED DESCRIPTION OF EMBODIMENTS

Embodiments of the present invention are described hereinafter based on the drawings.

FIG. 1 is a diagram to explain a configuration of a card issuing device 1 of an embodiment of the present invention, showing it from the side. FIG. 2 is a diagram to explain the configuration of the card issuing device 1 of FIG. 1, showing it from the top. FIG. 3 is a diagram showing the card issuing device 1 in the E-E direction of FIG. 1. FIG. 4 is an enlargement of section F of FIG. 1. FIG. 5 is a diagram showing the operation of a card-passing preventor 19 shown in FIG. 4: (A) shows its status when a card 2 is extracted from a card storage 3 toward a card processing section 4; (B) shows its status when the card 2 is inserted at a card insertion slot 11a into the card processing section 4. FIG. 6 is a block diagram showing how a control section 6 of the card issuing device 1 of FIG. 1 is configured with peripherals.

Note that, in the description below, the near side of the page in FIG. 1 is defined as the "front", the far side of the page in FIG. 1 is defined as the "rear (back)", the left side of FIG. 1 is the "left", the right side of FIG. 1 is the "right", the top side of FIG. 1 is the "top", and the bottom side of FIG. 1 is the "bottom". Also, the clockwise direction in FIG. 1 is defined as "clockwise", and the counterclockwise direction in FIG. 1 is "counterclockwise". Further, the left edge of the card 2 in FIG. 1 is defined as the "front edge" and the right edge is the "rear edge".

The card issuing device 1 of the present invention is for issuing a card 2 on which magnetic information is recorded in advance, and is to be installed in a predetermined host device such as a card issuing system (not illustrated). As shown in FIG. 1 through FIG. 3, the card issuing device 1 comprises a card storage 3 in which a plurality of cards 2 are stacked up and stored, a card processing section 4 to which the cards 2 are extracted from the card storage section 3 and at which the reading of magnetic information recorded on the cards is performed, and a card extracting mechanism 5 for extracting the cards 2 stored in the card storage section 3 toward the card processing section 4. As shown in FIG. 6, the card issuing device 1 is also provided with a control section 6 that performs various kinds of controls in the card issuing device 1. Note that the illustration of the cards 2 in the card storage 3 is omitted in FIG. 2.

The card storage 3 is arranged at the upper right of the card issuing device 1, and the card processing section 4 is arranged on the left side of the card storage 3. In other words, the cards 2 are extracted to the left from the card storage 3 in this embodiment. Also, the card extracting mechanism 5 is arranged below and on the left side of the card storage 3.

In this embodiment, the card 2 extracted by the card extracting mechanism 5 to the card processing section 4 is taken out from the card issuing device 1 as a user grasps the front edge of the card 2 and pulls it out. Note that when a user pulls out the card 2, magnetic information recorded on the card 2 is read by a magnetic head 16 which will be described later. Also, magnetic information recorded on the card 2 can be read by the magnetic heard 16 when the pulled-out card 2 is inserted into the card processing section and pulled out again.

The card 2 is a rectangular card made of vinyl chloride having a thickness of 0.7 to 0.8 mm. On the surface of the card 2, a magnetic strip 2a is formed over the entire range in the left-right direction to record magnetic information thereon, as shown in FIG. 2. In this embodiment, magnetic information is recorded in advance as described above; when the pre-recorded magnetic information is read at the card processing section 4 and the reading result is sent to the host device from the card issuing device 1, the card 2 is activated.

Note that the recording range of the magnetic information recorded on the magnetic strip 2a differs depending on the specification of the card 2. For example, while magnetic information may be recorded over the entire area of the magnetic strip 2a in the longitudinal direction (the left-right direction) in a card 2 having a certain specification, magnetic information may be recorded only on a portion of the magnetic strip 2a in the longitudinal direction in a card 2 having another specification. Also, the card 2 may be a PET card (polyethylene terephthalate card) having a thickness of 0.18 to 0.36 mm or a paper card having a predetermined thickness.

The card storage 3 is formed like a cubic box that opens to the top face. As shown in FIG. 2, in the bottom face section 3a which constitutes the bottom face of the card storage 3 is formed a passing hole 3b through which an extracting nail 33, a member of the card extracting mechanism 5 passes; the extracting nail will be described later. As shown in FIG. 4, between the bottom edge of the right side wall 3c of the card storage 3 and the bottom face portion 3a is formed a gate 8 through which the card 2 stored in the card storage section 3a is extracted toward the card processing section 4 (to the left). The gap of the gate 8 in the top-bottom direction is set such that a single card 2 can pass but two cards in stack cannot pass at the same time.

As shown in FIG. 1 and others, the card processing section 4 is provided with three guide members: a top guide member 9 positioned on the top side, a bottom guide member 10 positioned on the bottom side and an entrance guide member 11 positioned on the left edge side; they are fixed to frame 12 of the card issuing device 1.

As shown in FIG. 1 and others, the card processing section 4 is also provided with a magnetic head 16 for reading magnetic information recorded on the magnetic strip 2a, a front detecting section 17 and a rear detecting section 18 for detecting the edges of the card 2, and a card-passing preventor 19 that prevents the card 2 inserted through a card slot 11a, which will be described later, from passing toward the card storage 3. Note that the illustration of the front detecting section 17 and the rear detecting section 18 is omitted in FIG. 2 and FIG. 4. Also, the illustration of the card-passing preventor 19 is omitted in FIG. 2.

The top guide member 9 and the bottom guide member 10 are block-like members formed of resin. Between the top guide member 9 and the bottom guide member 10, a card transport path 20 is formed so that the card 2 is transported thereon. More specifically described, the card transport path 20 is formed linearly in the left-right direction between the top guide member 9 and the bottom guide member 10. Also as shown in FIG. 4, the right bottom corner of the top guide member 9 and the right top corner of the bottom guide member 10 are chamfered. In this way, the card 2 extracted from the card storage 3 can be transported smoothly onto the card transport path 20. Note that the top guide member 9 and the bottom guide member 10 may be metallic members formed by sheet metal working or die casting.

As shown in FIG. 4 and others, a recess portion 9a that is notched to the right and to the top is formed at the left bottom end of the top guide member 9. As shown in FIG. 3, the recess portion 9a is formed within a predetermined range in the front-back direction in the top guide member 9. For example, the width of the recess portion 9a in the front-back direction is about a half [as wide as] the short side of the card 2 (the direction perpendicular to the extracting direction of the card 2). Also, a recess portion 10a is formed at the left top end of the bottom guide member 10 such that it is notched to the right and to the bottom. The recess portion 10a is formed in a range corresponding to the recess portion 9a of the top guide member 9.

The recess portion 9a and the recess portion 10a together create an opening at the left end portion of the top guide member 9 and bottom guide member 10 as shown in FIG. 3, FIG. 4 and others, the opening being connected to the card transport path 20 and widened in the top-bottom direction as it goes to the left. The recess portions 9a and 10a are formed so as to be continuous with a finger placing section 11c formed at the entrance guide member 11, which will be described later; the fingers of a user can be placed in the recess portions 9a and 10a to pull out a card 2 from the card issuing device 1 and/or to insert a card 2 into the card issuing device 1.

The entrance guide member 11 is a block-like member formed of resin. At the entrance guide member 11, as shown in FIG. 2 and FIG. 3, a card slot 11a is formed for [a user] to take out the card 2 from the card issuing device 1 and to insert the card 2 into the card issuing device 1. More specifically described, the card slot 11a is formed to pass through the entrance guide member 11 in the left-right direction. Note that the entrance guide member 11 may be a metallic member formed by sheet metal working or die casting.

The card slot 11a is configured by a card guide portion 11b and the finger placing section 11c; the card guide section 11b guides the edge portion of the card 2 on the short side (in the front-back direction) inside the entrance guide member 11, and the fingers of a user are placed in the finger placing section 11c when the user pulls out the card 2 from the card issuing device 1 and when the user inserts the card 2 into the card issuing device 1.

As shown in FIG. 3, the card guide section 11b is formed on both sides of the card slot 11a in the front-back direction. The width of the card guide portion 11b in the top-bottom direction is slightly larger than the thickness of the card 2. Through the card guide section 11b, the card 2 is properly guided from the card transport path 20 toward the left end face of the entrance guide member 11 or from the left end face of the entrance guide member 11 toward the card transport path 20.

The finger placing section 11c is formed in a predetermined range in the front-back direction. More specifically described, the finger placing section 11c is formed in the range corresponding to the recess portions 9a and 10a in the front-back direction. Also, the finger placing section 11c is formed as a hole which is fanned out in the top-bottom direction as it goes to the left. More specifically described, the finger placing section 11c is formed to be continuous with the recess portions 9a and 10a. Since a user will place his fingers into the finger placing section 11c as described above, the finger placing section 11c is formed such that the user's fingers can be inserted.

The magnetic head 16 is arranged inside the entrance guide member 11. More specifically described, the magnetic head 16 is arranged to project from the bottom toward the card guide section 11b which is formed at the front end of the card slot 11a. The magnetic head 16 is urged upwardly by an urging member such as a flat spring which is not illustrated. In this embodiment, the magnetic head 16, the flat spring, etc. configures a processing mechanism that performs the reading of the magnetic information recorded on the card 2.

The front detecting section 17 is provided with a detection lever 21 which rotates upon contact with the card 2 and an optical sensor (not illustrated) which detects the rotation of the detection lever 21. A contact portion 21a of the detection lever 21 which makes contact with the card 2 is positioned in the vicinity of the magnetic head 16 in the left-right direction. More specifically described, it is positioned near the right edge of the magnetic head 16 as shown in FIG. 1, and the front detecting section 17 detects the edge of the card 2 in the vicinity of the right side of the magnetic head 16.

In the same manner as the front detecting section 17, the rear detecting section 18 is equipped with a detection lever 22 which rotates upon contact with the card 2 and with an optical sensor (not illustrated) which detects the rotation of the detection lever 22. A contact portion 22a of the detection lever 22 which makes contact with the card 2 is positioned in the vicinity of the card-passing preventor 19 in the left-right direction. More specifically described, it is positioned near the left edge of the card-passing preventor 19 and the rear detecting section 18 detects the end portion of the card 2 in the vicinity of the left side of the card-passing preventor 19.

The card-passing preventor 19, as shown in FIG. 5, is equipped with a stopper member 24 which makes contact with the card 2 and is rotatable, a fixed shaft 25 which is the axis of rotation of the stopper member 24, a helical torsion coil spring 26 which urges the stopper member 24 clockwise having the fixed shaft 25 as a center, and a control member (not illustrated) which controls the range of the rotation of the stopper member 24. The card-passing preventor 19 is positioned on the right end portion of the card-transport path 20.

In the stopper member 24 is formed a contact face 24a capable of making contact with the rear edge of the card 2. As shown in FIG. 4, when no external force is applied to the card-passing preventor 19, the contact face 24a is in parallel to the top-bottom direction and a portion of the stopper member 24 urged clockwise by the helical torsion coil spring 26 is in contact with the control member.

In this embodiment, as shown in FIG. 5 (A), when the card 2 is extracted from the card storage 3 toward the card processing section 4 (when the card 2 is extracted to the left), the stopper member 24 is rotated counterclockwise against the urging force of the helical torsion coil spring 26. Therefore, the card 2 passes through the card-passing preventor 19 to the left.

Also, as shown in FIG. 5 (B), the rear edge of the card 2 inserted through the card slot 11a comes in contact with the contact face 24a of the stopper member 24, the rotation of which is controlled by making contact with the control member. In this manner, the stopper member 24 prevents the card 2 from passing toward the card storage section 3.

The card extracting mechanism 5, as shown in FIG. 1 and others, is configured by a storage transporting mechanism 27 arranged under the card storage 3, an extracting roller 28 positioned between the gate 8 and the card-passing preventor 19, a pad roller 29 urged toward the extracting roller 28, a drive motor 30 as a drive source to drive the storage transporting mechanism 27 and the extracting roller 28, and a transmitting mechanism 31 which transmits the power of the drive motor 30 to the storage transporting mechanism 27 and the extracting roller 28. Note that, although the drive motor 30 of this embodiment is a stepping motor, for example, the drive motor 30 may be a DC motor other than a stepping motor.

The storage transporting mechanism 27 is configured by an extracting nail 33, a chain 34 to which the extracting nail 33 is fixed, and a pair of sprockets 35, 36, around which the chain 34 is tensioned, the extracting nail 33 being engaged with the rear edge of the card 2 stored at the bottom of the stack of a plurality of cards in the card storage 3 to extract the card 2 one at a time from the card storage 3 toward the gate 8. Note that the illustration of the extracting nail 33 and the chain 34 is omitted in FIG. 2.

The extracting roller 28 and the pad roller 29 are arranged to make contact with each other in the top-bottom direction. More specifically described, as shown in FIG. 1, the extracting roller 28 is positioned on the lower side so that the pad roller 29 makes contact with the extracting roller 28 from the top. Also, the extracting roller 28 and the pad roller 29 are positioned on the right side of the top guide member 9 and the bottom guide member 10 in the left-right direction. More specifically described, the extracting roller 28 and the pad roller 29 are positioned in the vicinity of the right side of the card-passing preventor 19. Note that the contact portion 22a of the detection lever 22 which configures the rear detecting section 18 is positioned in the vicinity of the left side of the card-passing preventor 19, as described above. In other words, the extracting roller 28 and the pad roller 29 are positioned in the vicinity of the right side of the contact portion 22a.

The transmitting mechanism 31 is configured by the following members: a driven pulley 37 which rotates coaxially with the sprocket 35 to transmit the power to the sprocket 35; a driven pulley 38 which rotates coaxially with the extracting roller 28 to transmit the power to the extracting roller 28; a drive pulley 39 fixed to an output shaft of the drive motor 30; a timing belt 40 tensioned around the above pulleys; and a tension pulley 41 which adjusts the tension of the timing belt 40. In this embodiment, the diameter of the driven pulley 38 is smaller than that of the driven pulley 37 so that the extracting speed of the extracting roller 28 to extract the card 2 is faster than that of the extracting nail 33.

When the drive motor 30 is rotated, the sprockets 35 and 36 are rotated so that the extracting nail 33 extracts the card 2 from the gate 8. Specifically, the extracting nail 33 moves from the right to the left in the passing hole 3b while engaged with the rear edge of the card 2 located at the bottom, to extract the card 2 from the gate 8.

After the front edge of the card 2 extracted from the gate 8 by the extracting nail 33 reaches the extracting roller 28, the card 2 is transported by the extracting roller 28 toward the card processing section 4. More specifically described, the card 2 is transported by the extracting roller 28 toward the card processing section 4 while sandwiched between the extracting roller 28 and the pad roller 29.

In this embodiment, the distance, L1, from the position of the contact face 24a when there is no external force applied to the card-passing preventor 19 to the gap position of the magnetic head 16 in the left-right direction (see FIG. 4) is slightly greater than the length of the card 2 in the longitudinal direction (transporting direction). For example, the distance, L1, is about 1 mm longer than the length of the card 2 in the longitudinal direction.

In this embodiment, the distance, L2, from the center of rotation of the extracting roller 28 (the contact position between the extracting roller 28 and the pad roller 29) to the gap position of the magnetic head 16 in the left-right direction (see FIG. 4) is greater than the length of the card 2 in the longitudinal direction. For example, the distance, L2, is about 6 mm longer than the length of the card 2 in the longitudinal direction.

Also, in this embodiment, distance, L3, from the contact position between the extracting roller 28 and the pad roller 29 to the right edge of the recess portion 9a, 10a in the left-right direction (see FIG. 4) is shorter than the length of the card 2 in the longitudinal direction. For example, the distance, L3, is about 20 mm shorter than the length of the card 2 in the longitudinal direction.

Further, in this embodiment, the distance from the contact position between the extracting roller 28 and the pad roller 29 to the contact portion 21a of the detection lever 21 in the left-right direction is about the same as the length of the card 2 in the longitudinal direction. Therefore, when the rear edge of the card 2 extracted from the card storage 3 exits the extracting roller 28 and the pad roller 29, the front edge of the card 2 is detected by the front detecting section 21.

The control section 6 is configured by a signal-transmitting/receiving section 42 and a motor control section 43 respectively associated with the magnetic head 16 and the drive motor 30. Also, the control section 6 is connected to a control command section 45 of the host device in which the card issuing device 1 is installed. Note that the signal-transmitting/receiving section 42 is realized by an input/output means such as an IO port. Also, the motor control section 43 is realized by a motor drive circuit having a transistor or by a computation means such as CPU.

The signal-transmitting/receiving section 42 is a means for sending and receiving signals between the control section 6 and the control command section 45. In this embodiment, the signal-transmitting/receiving section 42 transmits (outputs) the reading result of the magnetic information obtained by the magnetic head 16 to the control command section 45. In other words, the signal-transmitting/receiving section 42 of this embodiment is a transmitting means for transmitting the reading result of information recorded on the card 2 to the host device in which the card issuing device 1 is installed. Also, the signal transmitting/receiving section 42 outputs to the motor control section 43 a drive command of the drive motor 30 which is input from the control command section 45.

The motor control section 43 controls the drive motor 30. To the motor control section 43, a drive command of the drive motor 30 is input by the control command section 45 via the signal-transmitting/receiving section 42. More specifically described, when a card 2 is issued by the card issuing device 1, a drive command of the drive motor 30 is input to the motor control section 43 from the control command section 45. The motor control section 43 starts the drive motor 30 based on the drive command from the control command section 45.

Also, the result of the detection of the edge of the card 2 obtained by the rear detecting section 18 is input to the motor control section 43. The motor control section decelerates and stops the drive motor 30 based on the result of the detection of the front edge of the card 2 obtained by the rear detecting section 18. In this embodiment, the motor control section 43 starts decelerating the drive motor 30 after a predetermined period of time has passed after the detection of the front edge of the card 2 by the rear detecting section 18 to stop the drive motor 30. More specifically described, the motor control section 43 decelerates the drive motor 30 such that the drive motor 30 [lit: 31] stops when the rear edge of the card 2 exits the extracting roller 28 and the pad roller 29. In other words, in this embodiment, as the card 2 exits the extracting roller 28 and the pad roller 29, the extraction of the card 2 by the card extracting mechanism 5 is completed. More specifically described, the motor control section 43 decelerates the drive motor 30 so that the drive motor 30 [lit: 31] stops at the very moment that the rear edge of the card 2 exits the extracting roller 28 and the pad roller 29. In other words, the extraction of the card 2 by the card extracting mechanism 5 is completed at the very moment that the card 2 exits the extracting roller 28 and the pad roller 29.

As described above, the distance, L3, from the contact position between the extracting roller 28 and the pad roller 29 to the right side end of the recess portions 9a and 10a is shorter than the length of the card 2 in the longitudinal direction. For this reason, as the extraction of the card 2 by the card extracting mechanism 5 is complete when the rear edge of the card 2 exits the extracting roller 28 and the pad roller 29, the front edge of the card 2 is exposed to the finger placing section 11c and the recess portions 9a and 10a. Therefore, a user can place his fingers in the finger placing section 11c and the recess portions 9a and 10a so that he can grasp the front edge of the card 2 to pull the card 2 out from the card issuing device 1. In this embodiment, the finger placing section 11c and the recess portions 9a and 10a create a card-exposing section at which a portion of the front edge of the card 2 extracted by the card extracting mechanism 5 (specifically, the extracting roller 28) is exposed.

As described above, the distance, L2, from the contact position between the extracting roller 28 and the pad roller 29 to the gap position of the magnetic head 16 is set greater than the length of the card 2 in the longitudinal direction. Also, the extraction of the card 2 by the card extracting mechanism 5 is complete at the very moment that the card 2 exits the extracting roller 28 and the pad roller 29. Therefore, when a user pulls out the card 2 from the card issuing device 1 by holding the front edge portion of the card 2 after the completion of the extraction of the card 2 by the card extracting mechanism 5, the magnetic information recorded on the magnetic strip 2a is read by the magnetic head 16.

In the card issuing device 1 configured as above, a drive command of the drive motor 30 is input to the motor control section 43 from the control command section 45. Then, the drive motor 30 starts to extract the card 2 from the card storage 3. More specifically, the card 2 is first extracted by the extracting nail 33 and then sent (moved) by the extracting roller 28. Soon, the front edge of the card 2 is detected by the rear detecting section 18, and the motor control section 43 decelerates the drive motor 30 to stop it such that the extracting roller 28 and the pad roller 29 are stopped at the very moment that the card 2 exits the extracting roller 28 and the pad roller 29.

As the drive motor 30 is stopped, the front edge portion of the card 2 is exposed at the finger placing section 11c and the recess portions 9a and 10a. As the card 2 is exposed, a user grasps the front edge portion of the card 2 and pulls out the card 2 from the card issuing device 1. At that time, the magnetic information recorded on the card 2 is read by the magnetic head 16. After the magnetic information is read, the signal-transmitting/receiving section 42 transmits the magnetic information reading result obtained by the magnetic head 16 to the control command section 45.

If the reading of the magnetic information fails when a user pulls out the card 2, the host device sends the user a warning to indicate the necessity of reading the magnetic information again. For example, when a display is provided to the host device, the display will indicate the necessity of reading the magnetic information again. Or, when a flashing lamp is provided to the host device, the lamp is flashed to indicate the necessity of reading the magnetic information again.

Given a warning, the user inserts the card 2 at the card slot 11a into the card issuing device 1 (specifically, into the card processing section 4). More specifically described, the user continues inserting the card 2 to the card processing section 4 until the rear edge of the card 2 makes contact with the contact face 24a of the stopper member 24, and then pulls out the card 2. When the card 2 is pulled out, magnetic information is read by the magnetic head 16. As the magnetic information is read, the signal-transmitting/receiving section 42 transmits the magnetic information reading result obtained by the magnetic head 16 to the control command 45. Note that, if the reading of the magnetic information fails again, the host device gives the user a warning to indicate the necessity of reading the magnetic information again.

As described above, a portion of the card 2 extracted by the card extracting mechanism 3 is exposed at the card exposing section, which is created by the finger placing section 11c and the recess portions 9a and 10a. Therefore, a user can grasp the card 2 which is extracted by the card extracting mechanism 3 and is partially exposed at the finger placing section 11c and the recess portions 9a and 10a to pull out the card 2 from the card processing section 4. Therefore, there is no need to provide a card-transporting mechanism configured by a transport roller, a motor, etc. Consequently the configuration of the card issuing device 1 can be simplified, downsizing the card issuing device 1 and lowering its manufacturing cost.

In particular, a portion of the card 2 extracted by the extracting roller 28 is exposed at the finger placing section 11c and the recess portions 9a and 10a in this embodiment. Therefore, the card 2 can be extracted by the extracting roller 28 with precision such that a portion of the card 2 is exposed at the finger placing section 11c and the recess portions 9a and 10a.

In this embodiment, the card issuing device 1 is equipped with a card-passing preventor 19 for preventing the card 2 from passing from the card processing section 4 toward the card storage 3. Therefore, even when magnetic information can not be properly read by the card processing section 4 at the time of issuing a card and therefore a user inserts the card 2 to the card processing section 2 once more to have magnetic information read at the card processing section 4, the card 2 is prevented from entering inside the card storage 3. Thus, damage to the card 2 or a card jam can be prevented.

In this embodiment, the distance, L2, from the center of rotation of the extracting roller 28 to the gap position of the magnetic head 16 is greater than the length of the card 2 in the longitudinal direction. Therefore, even when the magnetic strip 2a stretches over the entire area in the left-right direction, magnetic information recorded on the magnetic strip 2a can be read when a user pulls out the card 2 from the card processing section 4.

In this embodiment, the card extracting mechanism 5 completes the extraction of the card 2 when the card 2 exits the extracting roller 28 and the pad roller 29. Therefore, the pulling resistance which occurs when a user pulls out the card 2 from the card processing section 4 can be reduced. Consequently a user can easily pull the card from the card processing section 4. Also, in this embodiment, the motor control section 43 starts decelerating the drive motor 30 after a predetermined period of time has passed after the rear detecting section 18 detects the front edge of the card 2, and stops it. In this way, even in the case that the extraction of the card 2 is completed when the card 2 exits the extracting roller 28 and the pad roller 29, accuracy of stopping the card 2 can be improved. As a result, the card 2 can be extracted such that the front edge of the card 2 comes on the right side of the magnetic head 16 with precision when the card 2 stops.

In this embodiment, the storage transporting mechanism 27 and the extracting roller 28 are driven by a common drive motor 30. Therefore, there is no need to separately provide a drive source for the storage transporting mechanism 27 and a drive source for the extracting roller 28, thus simplifying the configuration of the card issuing device 1.

In this embodiment, the card issuing device 1 is equipped with a signal-transmitting/receiving section 42 which transmits the reading result of information recorded on the card 2 to the host device in which the card issuing device 1 is installed. Therefore, when magnetic information recorded on the card 2 can not be properly read, a user can be given a warning that the information needs to be read again. Thus, magnetic information recorded on the card 2 can be read with precision.

The above described embodiment is an example of the preferred embodiments of the present invention; however, the present invention is not limited to this, but can be variously modified within the scope of the invention.

In the above described embodiment, the finger placing section 11c is formed as a hole passing through the entrance guide member 11 in the left-right direction. However, instead of a hole, the finger placing section may be a notch formed by completely cutting a portion of the entrance guide member 11 in the front-back direction. Also, although the card exposing section is configured by the recess portions 9a and 10a and the finger placing section 11c in the above described embodiment, the recess portions 9a and 10a may not be formed in the top guide member 9 and the bottom guide member 10 but the card exposing section may instead be configured only by the finger placing section 11c.

In the above described embodiment, the card 2 is extracted by the extracting nail 33 from the card storage toward the gate 8. However, in place of the extracting nail 33, a roller may be arranged on the bottom face of the card storage 3, by which the card 2 is extracted from the card storage 3 toward the gate 8. Also, in the above-described embodiment, the card 2 extracted by the extracting roller 28 is exposed at the card exposing section. However, the extracting roller 28 may be eliminated and the movable range of the extracting nail 33 be changed to extract the card 2 with the extracting nail 33 from the card storage 3 such that the card 2 is exposed at the card exposing section.

In the above embodiment, the motor control section 43 decelerates the drive motor 30 such that the drive motor 30 stops when the card 2 exits the extracting roller 28 and the pad roller 29. However, the motor control section 43 may decelerate the drive motor 30 such that the drive motor 30 stops while the rear edge portion of the card 2 is [still] sandwiched between the extracting roller 28 and the pad roller 29. In other words, the extraction of the card 2 may be complete when the rear edge of the card 2 is held between the extracting roller 28 and the pad roller 29. In this way, the card 2 can be precisely stopped by the extracting roller 28 and the pad roller 29 so that an appropriate processing can be performed at the card processing section 4 after the card 2 is stopped.

In the above described embodiment, the card-passing preventor 19 is configured by the rotatable stopper member 24 and the helical torsion coil spring 26. However, the card-passing preventor may be configured by a stopper member that oscillates up and down and a drive mechanism such as a solenoid that drives the stopper member up and down.

In the above described embodiment, the distance, L2, from the center of rotation of the extracting roller 28 to the gap position of the magnetic head 16 in the left-right direction is greater than the length of the card 2 in the longitudinal direction. However, when a card 2 having magnetic information recorded on only a portion of the magnetic strip 2a in the longitudinal direction is issued by the card issuing device 1, the distance from the center of rotation of the extracting roller 28 and the gap position of the magnetic head 16 in the left-right direction can be any length as long as it is greater than the range on the magnetic strip 2a over which magnetic information is recorded. More specifically, the distance from the center of rotation of the extracting roller 28 to the gap position of the magnetic head 16 in the left-right direction can be any length as long as it is greater than the distance from the recording start position of the magnetic information on the front edge side of the card 2 to the rear edge of the card 2. In this way, while a user pulls out the card 2 from the card processing section 4, magnetic information recorded on the magnetic strip 2a can be properly read.

Note that, in the above case, as long as the distance from the center of rotation of the extracting roller 28 to the gap position of the magnetic head 16 in the left-right direction is set almost equal to or slightly greater than the distance from the starting position for recording magnetic information on the front edge side of the card 2 to the rear edge of the card 2, the card issuing device 1 can be downsized.

In the above-described embodiment, the card 2 is a magnetic card having a magnetic strip 2a. However, the card 2 may be a contact-type IC card having an IC chip fixed on the surface thereof or a non-contact type IC card having a communication antenna built therein. In this case, a processing mechanism having IC contacts that make contact with IC chips or a processing mechanism having a communication antenna that communicates with antennas built in cards 2 is arranged at the card processing section 4. In this case, not only the reading of information recorded on the card 2, but also the recording of information to the card 2 may be performed. Note that, in this case, it is preferred that a shutter be arranged inside the entrance guide member 11 so that the card 2 will not be pulled out by a user during the reading or recording of information.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

What is claimed is:

1. A card issuing device comprising:
    a card storage in which a plurality of cards are stacked up and stored;
    a card processing section to which said cards extracted from said card storage are sent and at which information recorded on said cards are read and/or information is recorded on said cards; and
    a card extracting mechanism for extracting said cards stored in said card storage toward said card processing section;
    wherein said card processing section is provided with a card exposing section so that a portion of said card extracted by said card extracting mechanism is exposed;
    wherein said card processing section has a processing mechanism that reads and/or records information on said cards;
    wherein said card extracting mechanism is equipped with an extracting roller arranged between said card storage and said processing mechanism for extracting said cards toward said card processing section; and
    wherein a portion of said card extracted by said extracting roller is exposed at said card exposing section.

2. The card issuing device as set forth in claim 1;
    wherein a card-passing preventor is also provided to prevent said cards from passing from said card processing section toward said card storage.

3. The card issuing device as set forth in claim 1;
    wherein said card has a magnetic strip on which magnetic information is recorded;
    wherein said processing mechanism is provided with a magnetic head for reading magnetic information recorded on said magnetic strip; and
    wherein the distance from said extracting roller to said magnetic head is greater than the length of said magnetic strip on which said magnetic information is recorded.

4. The card issuing device as set forth in claim 1;
    wherein said card extracting mechanism is provided with a pad roller that is urged toward said extracting roller; and
    wherein the extraction of said card is complete when said card exits said extracting roller and said pad roller.

5. The card issuing device as set forth in claim 1;
    wherein said card extracting mechanism is provided with a pad roller that is urged toward said extracting roller; and
    wherein extraction of said card is complete while the edge portion of said card close to said card storage in the extracting direction of said card is held between said extracting roller and said pad roller.

6. The card issuing device as set forth in claim 4, further comprising:
    a drive motor for driving said extracting roller;
    a detecting section arranged in the vicinity of said extracting roller for detecting the edge portion of said card in said extracting direction; and
    a motor control section for controlling said drive motor;
    wherein said motor control section decelerates said drive motor after a predetermined period of time has passed after said detecting section detects the edge portion of said card close to said card processing section in said extracting direction, and then stops said motor.

7. The card issuing device as set forth in claim 1;
    wherein said card extracting mechanism is provided with a storage transporting mechanism arranged on the bottom face of said card storage; and
    wherein said storage transporting mechanism and said extracting roller are driven by a common drive source.

8. The card issuing device as set forth in claim 1;
    wherein a signal-transmitting means is provided for transmitting the reading result of information recorded on said card to a host device in which said card issuing device is installed.

* * * * *